(12) United States Patent
Shah

(10) Patent No.: US 12,502,604 B2
(45) Date of Patent: Dec. 23, 2025

(54) VIDEO GAME ANIMATION ENGINE

(71) Applicant: Microsoft Technology Licensing, LLC, Redmond, WA (US)

(72) Inventor: Haider Shah, Brampton (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 272 days.

(21) Appl. No.: 18/335,099

(22) Filed: Jun. 14, 2023

(65) Prior Publication Data

US 2024/0416232 A1    Dec. 19, 2024

(51) Int. Cl.
*A63F 13/52*   (2014.01)
*A63F 13/54*   (2014.01)
*G06T 13/00*   (2011.01)

(52) U.S. Cl.
CPC .............. *A63F 13/52* (2014.09); *A63F 13/54* (2014.09); *G06T 13/00* (2013.01); *G06T 2200/24* (2013.01)

(58) Field of Classification Search
CPC .......... A63F 13/52; A63F 13/54; G06T 13/00; G06T 2200/24
See application file for complete search history.

(56) References Cited

U.S. PATENT DOCUMENTS

2015/0199978 A1*  7/2015  McCoy .................. G10L 21/10
                                                         704/270
2020/0167984 A1*  5/2020  Cappello ................ G06T 19/00

FOREIGN PATENT DOCUMENTS

EP         3657445 A1    5/2020

OTHER PUBLICATIONS

Ferreira, Joao P, et al., "Learning to Dance: A Graph Convolutional Adversarial Network to Generate Realistic Dance Motions from Audio", arxiv.org, Feb. 1, 2021, pp. 1-14.
International Search Report and Written Opinion received for PCT Application No. PCT/US2024/032458, Oct. 1, 2024, 15 pages.

* cited by examiner

*Primary Examiner* — Werner G Garner
(74) *Attorney, Agent, or Firm* — CALFEE, HALTER & GRISWOLD LLP

(57) ABSTRACT

Described herein are technologies relating to insertion of audio cues for a sound into animations of video games. A video game animation engine obtains feature values corresponding to an animation at a timestep and provides the feature values to a computer-implemented model. The computer-implemented model computes a confidence score for the timestep, where the confidence score is indicative of a likelihood that an audio cue for the sound should be inserted in the animation at the timestep. The video game animation engine inserts the audio cue for the sound at the timestep based upon the confidence score.

18 Claims, 10 Drawing Sheets

SKELETON NAME: SKELETON 1
TRACK NAME: TRACK 1
MODEL NAME: MODEL 1
ANIMATION NAME: ANIMATION 1
PREDICTED TIME: 1.04
PREDICTED PROBABILITY: .78

SKELETON NAME: SKELETON 1
TRACK NAME: TRACK 1
MODEL NAME: MODEL 1
ANIMATION NAME: ANIMATION 1
PREDICTED TIME: 1.8
PREDICTED PROBABILITY: .85

SKELETON NAME: SKELETON 1
TRACK NAME: TRACK 3
MODEL NAME: MODEL 1
ANIMATION NAME: ANIMATION 1
PREDICTED TIME: 1.5
PREDICTED PROBABILITY: .72

VIDEO GAME ANIMATION ENGINE

BACKGROUND

A modern video game can include numerous characters that move about in environments of the video game. For example, in a basketball video game, numerous computer-implemented basketball players move about a virtual basketball court. As video games have continued to become increasingly sophisticated, audio associated with video games has become similarly more sophisticated. Continuing with the example of the basketball video game, a sound can be emitted by the video game each time that a foot of a computer-implemented basketball player hits the court, thereby enhancing an overall experience of a player of the video game with respect to the video game. Further, the video game can be configured to emit a first sound when a heel of a foot impacts the court and a second sound when a toe of the foot is lifted from the court. Moreover, the video game can emit different sounds depending upon whether the toe or the heel of the foot initially impacts the court.

A sophisticated video game can include hundreds to thousands of different sounds that may occur throughout play of the video game. Conventionally, a video game animation engine provides tools to a video game developer (including an audio engineer) for inserting audio cues for sounds in different animations that may occur when the video game is played. In an example, an animation that may occur in a basketball video game can be a player jogging forward at a particular speed at a 45 degree angle relative to a horizontal reference line that runs parallel with a display that depicts the animation. Such animation can be relatively short, such as on the order of one to two seconds in length. The video game animation engine can include a window where the animation can be played and an interface that allows the audio engineer to manually place audio cues for different sounds that occur when the animation is played in the video game. Hence, the video game animation engine allows the audio engineer to visually inspect state of the animation and place audio cues for different sounds depending upon the state of the animation (e.g., a first audio cue for a first sound when a right foot impacts the floor, a second audio cue for a second sound when the right foot leaves the floor, a third audio cue for a third sound when a left foot impacts the floor, and so forth).

As indicated previously, a sophisticated video game can include hundreds to thousands of different animations, with each animation having numerous different sounds that are to be emitted at different timesteps of the animation when the animation is played during play of the video game. The video game animation engine requires a significant amount of manual input from the audio engineer to place audio cues for sounds at appropriate timesteps in various animations, resulting in a significant amount of time and computing resources being employed for audio cues to be placed in video game animations.

SUMMARY

The following is a brief summary of subject matter that is described in greater detail herein. This summary is not intended to be limiting as to the scope of the claims.

Described herein are various technologies pertaining to a video game animation engine that is configured to place audio cues at appropriate timesteps of animations of a video game. The video game animation engine described herein is an improvement over conventional video game animation engines, as the video game animation engine described herein requires less manual input from an audio engineer with respect to placement of audio cues when compared to the manual input required from the audio engineers by conventional video game animation engines.

As noted above, the video game animation engine is employed by developers to develop video games. A video game can include several animations, where an animation includes an animation skeleton that has interconnected bones (e.g., hierarchically arranged with respect to one another). At each timestep in an animation (e.g., each 0.02 seconds of the animation), the interconnected bones have values of features assigned thereto. Example features of a bone can include coordinates of a centroid of the bone in an environment (e.g., X, Y, and Z coordinates), tilt, yaw, roll, and so forth. During a training phase, the video game animation engine receives input from a developer of the video game as to timesteps of the animation where audio cues are to be inserted with respect to an animation that includes an animation skeleton. The video game animation engine can receive a relatively small number of audio cue placements for the animation from the developer (e.g., 50 audio cues).

The video game animation engine, for several different timesteps in the animation (including timesteps where audio cues have been placed by the developer and timesteps where audio cues have not been placed by the developer), obtains the feature values of the interconnected bones of the animation skeleton in the animation. Further, for the different timesteps in the animation, the video game animation engine can compute additional feature values based upon the feature values of the interconnected bones. The additional feature values can include, for example, velocity of a bone in the interconnected bones, acceleration of a bone in the interconnected bones, rotational velocity of a bone in the interconnected bones, and so forth. A computer-implemented model is trained based upon the feature values of the interconnected bones at the different timesteps, the additional feature values computed by the video game animation engine, and labels that indicate whether audio cues begin at such timesteps. Once trained, the computer-implemented model receives feature values (and additional feature values computed by the video game animation engine) for a timestep and outputs a confidence value that is indicative of a likelihood that an audio cue for a particular sound is to be initiated at the timestep.

When the video game animation engine is employed by a developer (an audio engineer) to insert audio cues for a sound at timesteps of an animation, the video game animation engine can receive a request from the developer to execute a heuristic algorithm to initially place the audio cues at different timesteps in the animation. A developer can design the heuristic algorithm to initially insert audio cues at appropriate timesteps of the animation. For example, when the sound is a foot contacting a basketball court, the heuristic algorithm can cause audio cues to be inserted at timesteps where a foot of the animation skeleton impacts the court. Hence, the video game animation engine can be configured to place audio cues for the sound at different timesteps of the animation.

Subsequently, the video game animation engine can receive an indication that the positions of the audio cues are to be refined through use of the computer-implemented model discussed above. To that end, the video game animation engine identifies a timestep that has an audio cue assigned thereto by the heuristic algorithm. The video game animation engine then selects timesteps that are within a window of time of predefined size centered at such timestep (e.g., the timestep and twenty timesteps that surround the timestep), obtains feature values for the selected timesteps, and optionally computes additional feature values for the selected timesteps. The video game animation engine, for the selected timesteps, provides the feature values and optionally the additional feature values to the computer-implemented model. The computer-implemented model computes, for each timestep in the selected timesteps, a respective confidence score that is indicative of a likelihood that an audio cue for the sound should begin at the timestep.

The video game animation engine inserts an audio cue at a timestep that has a confidence value that is above a predefined threshold. When there are no timesteps with a confidence value above the predefined threshold, no audio cue is placed at any of the selected timesteps. When there are multiple timesteps in the selected timesteps that have confidence scores above the threshold, the video game animation engine can insert an audio cue at the timestep with the highest confidence score. Alternatively, the video game animation engine can insert an audio cue at each timestep that has a confidence score above the predefined threshold. Using the heuristic algorithm to initially identify timesteps where audio cues may be inserted and then selecting timesteps that surround the initially identified timesteps can reduce the number of false positives that would otherwise be output by the video game engine based upon the confidence scores and can further save computational resources, as the computer-implemented model need not be provided with all feature values of all timesteps of the animation.

After audio cues are inserted into the animation, a graphical user interface of the video game animation engine can depict graphical representations of such audio cues to the developer. The video game animation engine can receive indications from the developer that the placement of the audio cues is accepted and/or can receive indications from the developer that one or more of the audio cues are to be moved. After the developer has finalized placement of the audio cues for the sound in the animation, the computer-implemented model can be further trained based upon such input from the developer. Hence, the computer-implemented model improves over time as such model is employed to insert audio cues in animations. During play of the video game, when a portion of the animation is played, sounds are emitted at times that correspond to the timesteps where the audio cues are inserted.

The video game animation engine exhibits various advantages over conventional video game animation engines. The video game animation engine described herein need not receive thousands to hundreds of thousands of manual inputs from a developer to place audio cues within animations of a video game. Moreover, the video game animation engine places audio cues that reflect preferences of an audio engineer and is not restricted to the rigidity of heuristic algorithms.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 6 depicts example output of a computer-implemented model with respect to predicting whether an audio cue for a sound should be inserted at a timestep of a video game animation.

DETAILED DESCRIPTION

Figure 1:
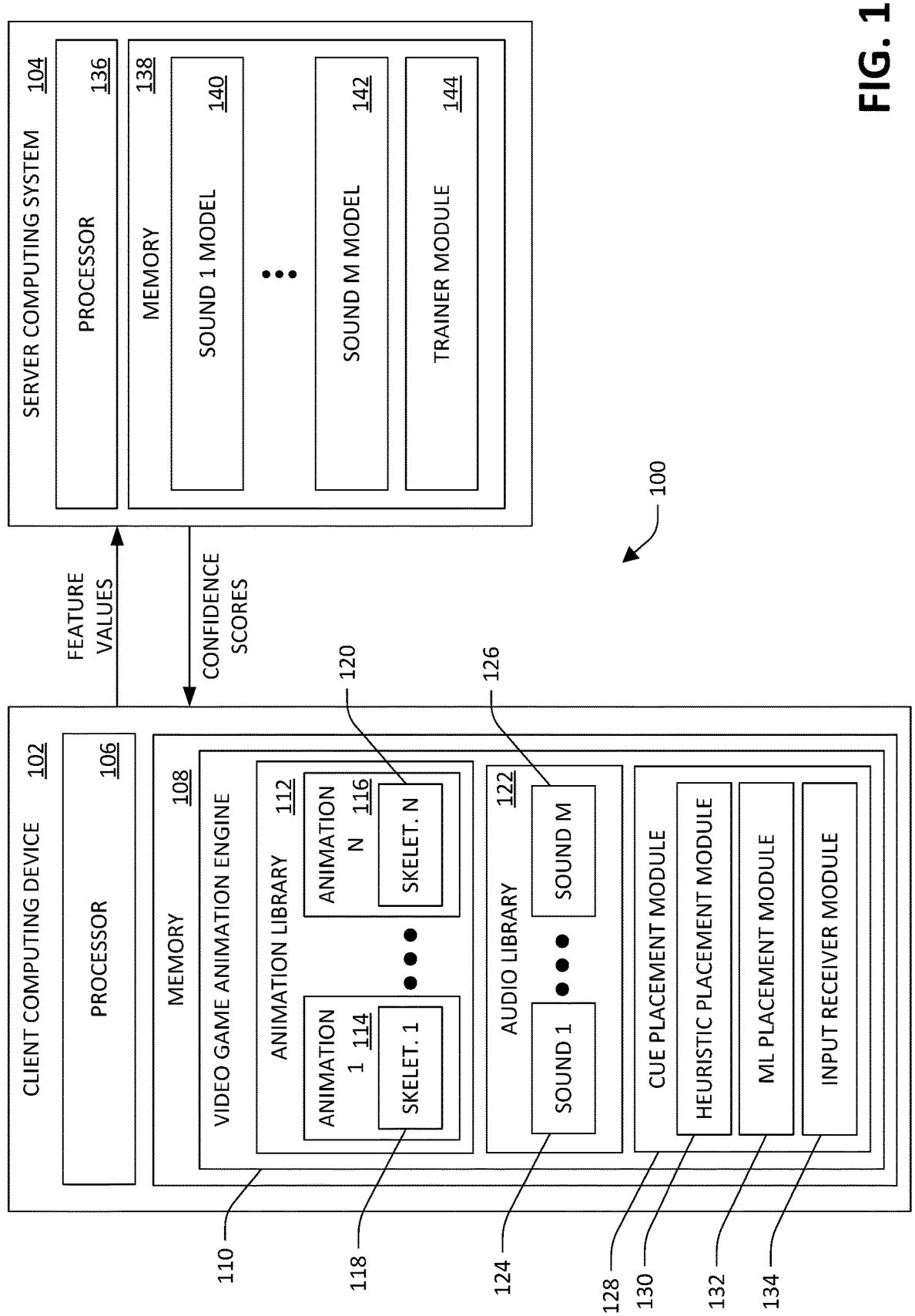
FIG. 1 is a functional block diagram of a computing system that facilitates insertion of audio cues at timesteps of a video game animation.

Various technologies pertaining to placement of audio cues for sounds in video game animations are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component," "module," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Described herein is an improved computer-executable video game animation engine that is configured to assist a developer of a video game with placement of audio cues for sounds in video game animations, where an audio cue for a sound in a video game animation indicates when the sound is to be emitted during play of a video game. The term "video game animation engine" encompasses plugins to video game animation engines and functionality performed by such plugins in addition to off the shelf video game animation engines and functionality performed by such engines. The animation includes an animation skeleton that comprises interconnected bones, where the animation skeleton, during the animation, moves over a time window that includes numerous timesteps, where the timesteps are at a predefined interval (e.g., every 0.02 seconds). The video game animation engine receives an indication from a developer of the video game that audio cues for a sound are to be inserted at timesteps of the animation such that the sound is emitted at appropriate times when the animation is presented during play of the video game. In response to receiving such indication, the video game animation engine obtains feature values of the interconnected bones of the animation skeleton within the animation for a timestep of the animation. Optionally, the video game animation engine computes additional feature values of the interconnected bones at the timestep. For example, the feature values can include values that are indicative of locations and orientations of interconnected bones at the timestep, and the additional feature values can include values that are indicative of acceleration, velocity, etc. of the interconnected bones at the timestep.

The video game animation engine provides the feature values (and optionally the additional feature values) to a computer-implemented model that is trained to compute confidence scores with respect to placement of audio cues at timesteps based upon feature values (and optionally additional feature values). Hence, the computer-implemented model computes a confidence score that is indicative of a likelihood that a developer of the video game would place an audio cue for the sound at the timestep based upon the features values (and additional feature values) of the interconnected bones at the timestep. When the confidence score is above a predefined threshold (e.g., 0.75), the video game animation engine inserts an audio cue for the sound at the timestep. Such technologies provide a significant improvement over conventional video game animation engines (and specifically an improvement over conventional approaches to audio cue placement), as such engines require receipt of manual input for thousands to hundreds of thousands of audio cues for sounds of video games.

With reference now to FIG. 1, a computing system 100 that is configured to insert audio cues for a sound with respect to an animation of a video game is illustrated. The computing system 100 includes a client computing device 102 and a server computing system 104 that is in communication with the client computing device 102 by way of a suitable network connection. While functionality is illustrated as being split between a client computing device and a server computing system, it is to be understood that some functionality described as being performed by the client computing device 102 may be performed by the server computing system 104, while some functionality described as being performed by the server computing system 104 can be performed by the client computing device 102. The client computing device 102 includes a processor 106 and memory 108 that has instructions stored therein that are executed by the processor 106.

With more particularity, the memory 108 has a video game animation engine 110 loaded therein. The video game animation engine 110 is usable by a developer of a video game to develop animations that are to be presented during play of the video game. The video game animation engine 110 is further usable by a developer of the video game to assign audio cues for sounds to timesteps of the animations, such that when the video game is played by a video game player, sounds are emitted in accordance with placement of the audio cues by the developer.

The video game animation engine 110 can include an animation library 112, where the animation library 112 includes N animations 114-116. The animations 114-116 include respective animation skeletons 118-120, where the animation skeletons 118-120 have interconnected bones. In an example, the interconnected bones are hierarchically arranged with respect to one another. In another example, the interconnected bones are represented by a mesh that includes vertices. The animations 114-116 are of a time duration that may alter between animations. For example, the first animation 114 has a duration of two seconds, while the Nth animation 116 has a duration of three seconds. With respect to placement of audio cues in the animations, the animations 114-116 can include timesteps that are placed at intervals of the animation (where the intervals can be predefined intervals or irregular intervals, depending upon the type of animation). For example, the animations 114-116 have timesteps placed at 0.01 seconds from one another. In another example, the animations 114-116 have timesteps placed at 0.02 seconds from one another.

The animation skeletons 118-120 (and interconnected bones included within such skeletons 118 through 120) move during the animations 114-116. The animation skeletons 118-120 can be representative of human skeletons, animal skeletons, etc. Further, one or more of the animation skeletons 118-120 can represent other animatable objects, such as a leaf on a tree, a door that opens and closes, and so forth. The animation library 112 can include tens to hundreds to thousands to even hundreds of thousands of different animations.

The interconnected bones of the animation skeletons 118-120 have values for features corresponding to the timesteps of the animations 114-116. For instance, at timestep $T_i$ of the first animation 114, a bone in the interconnected bones of the first animation skeleton 118 include values for features such as location and orientation (e.g., X, Y, and Z coordinates, roll, pitch, and yaw).

The video game animation engine 110 also includes an audio library 122, where the audio library 122 includes M sounds 124-126 that are to be emitted during play of the video game. The sounds 124-126 are typically those that are repeated during play of the video game, often referred to as Foley sounds. Examples include, but are not limited to, a sound of a basketball hitting a court, a sound of a falling footstep, a sound of a swinging door, a sound of leaves of a tree being blown in the wind, and so forth. During development of the video game, the video game animation engine 110 can receive a selection of an animation in the animations 118-120 and can receive a selection of a sound in the sounds 124-126 from a developer, where audio cues for the selected sound can be assigned to timesteps of the selected animation.

The video animation engine 110 also includes a cue placement module 128 that is configured to insert audio cues for sounds in the audio library 122 at timesteps of at least one of the animations 114-116 in the animation library 112. With more specificity, the cue placement module 128 can be modified to include a heuristic placement module 130 that heuristically places audio cues for a sound at timesteps in an animation. For example, the video game animation engine can be modified by an engineer (through modification of the engine itself or through use of a plugin) to execute a heuristic algorithm that results in the automatic placement of an audio cue at each timestep in the animation when a portion of a foot of a character first impacts a surface. Thus, the heuristic placement module 130 is configured to place audio cues at timesteps of an animation based upon values of features of at least one bone in the interconnected bones of the animation skeleton that is included in the animation. Hence, when the video game is played, the sound (e.g., a falling footstep sound) is emitted when the foot of a character contacts the surface in the video game. While this approach alone may initially appear to address deficiencies of a video game animation engine with respect to requiring manual input from audio engineers to place audio cues, in practice the use of heuristic algorithms to automatically insert audio cues in animations has been found to be unduly rigid. More specifically, it has been observed that audio engineers frequently must manually alter placement of audio cues that have been initially assigned to timesteps in the animation through use of the heuristic algorithm.

The cue placement module 128 also includes a machine learning (ML) placement module 132 that places audio cues for sounds at timesteps of animations based upon outputs of computer-implemented models that have been trained to identify whether audio cues are to be inserted at timesteps of animations. The ML placement module 132 obtains values of features of interconnected bones in an animation skeleton for a timestep of the animation. Optionally, the ML placement module 132 computes values for additional features of the interconnected bones for the timestep. For instance, the features of the interconnected bones are position and orientation features (X, Y, Z coordinates, roll, pitch, yaw), while the additional features of the interconnected bones computed by the ML placement module 132 are linear velocity, linear acceleration, rotational velocity, rotational acceleration, and/or the like. The ML placement module 132 provides the values of the features and optionally the values of the additional features as input to a computer-implemented model that has been trained to compute confidence scores with respect to placement of audio cues for a sound at timesteps of an animation.

The ML placement module 132 inserts audio cues for the sound based upon confidence scores received from the computer-implemented model for timesteps in the animation. As will be described in greater detail below, the ML placement module 130 can select timesteps in the animation based upon timesteps in the animation where the heuristic placement module 130 inserted audio cues. For instance, the ML placement module 132 selects timesteps of the animation within a window of time that is centered upon a timestep where the heuristic placement module 130 inserted an audio cue. The ML placement module 132 can obtain feature values and compute additional feature values for the selected timesteps and provide such feature values and additional feature values to the computer-implemented model. The computer-implemented model computes confidence scores for the timesteps selected by the ML placement module 132, and the ML placement module 132 can insert an audio cue at a timestep that has a confidence score assigned thereto that is above a predefined threshold. This approach is advantageous, and conserves computational resources, as the computer-implemented model need not be provided with feature values and additional feature values for all timesteps in the animation. In another example, however, the computer-implemented model is provided with feature values (and additional feature values) for all timesteps of the animation, and thus outputs confidence scores for all timesteps in the animation.

In an example, when there are multiple timesteps in the selected timesteps that have confidence scores that are above the predefined threshold, the ML placement module 132 inserts an audio cue for the sound at each of the multiple timesteps. In another example, when there are multiple timesteps in the selected timesteps that have confidence scores that are above the predefined threshold, the ML placement module 132 determines which of the timesteps has the highest confidence score and inserts an audio cue only at a position that corresponds to the timestep that has the highest confidence score. Other examples are also contemplated.

The cue placement module 128 further includes an input receiver module 134. The input receiver module 134 receives manual input from the developer as to placement of audio cues at timesteps of animations. The input receiver module 134 can also receive confirmation as to whether the ML placement module 132 properly placed an audio cue at a timestep of an animation. The computer-implemented model referenced above can be further trained based upon developer input received by the input receiver module 134.

The server computing system 104 includes a processor 136 and memory 138, where the processor 136 executes instructions that are stored in the memory 138. The memory 138 includes several computer-implemented models (sound models 140-142) that are trained to predict whether audio cues for sounds are to be placed at timesteps of animations. For instance, the first sound model 140 is trained to compute confidence scores with respect to placement of audio cues for the first sound 124 at timesteps of animations, while the Mth sound model 142 is trained to compute confidence scores with respect to placement of audio cues for the Mth sound 125 at timesteps of animations. In an example, a sound model can be specifically trained for a particular skeleton and sound type (such as a landing foot sound instead of a lifting foot sound).

The memory 138 also includes a trainer module 144 that trains the sound models 140-142 based upon values of features of interconnected bones of animations at different timesteps of the animations, values of additional features of the interconnected bones of the animations at the different timesteps of the animations, and labels that indicate whether or not audio cues are placed at such different timesteps and approved by a developer of a video game. In an example, the trainer module 144 trains the sound models 140-142 periodically (e.g., once a day, once a week, etc.) based upon inputs received by the input receiver module 134.

While the video game animation engine 110 is illustrated as being installed on the client computing device 102, it is understood that the video game animation engine 110 (or portions thereof) can be installed on the server computing system 104. Further, while the sound models 140-142 and the trainer module 144 are illustrated in FIG. 1 as being executed on the server computing system 104, it is to be understood that the sound models 140-142 (or portions thereof) and/or the trainer module 144 can be executed on the client computing device 102.

An example operation of the computing system 100 is now set forth. The video game animation engine 110 receives, from a developer of a video game, selection of an animation in the animation library 112, where audio cues for a sound are to be placed at one or more timesteps of the animation. For instance, the video game animation engine 110 receives a selection of the first animation 114 from the animation library 112. The video game animation engine 110 optionally further receives, from the developer of the video game, selection of a sound from the audio library 122, where audio cues for the selected sound are to be placed at one or more timesteps of the first animation 114. For example, the video game animation engine 110 receives a selection of the first sound 124 from the developer of the video game. In another example, the video game animation engine 110 can automatically identify a sound model that is applicable to an animation being reviewed by a sound engineer and can further set forth audio cues for timesteps based upon output of the sound model.

The video game animation engine 110 can receive an indication that the cue placement module 128 is to be employed to insert audio cues for the first sound 124 at one or more timesteps of the first animation 114. Optionally, the heuristic placement module 130 executes a heuristic algorithm assigned to the first sound 124, such that the heuristic placement module 130 places audio cues for the first sound 124 at one or more timesteps of the first animation 114 based upon values of features of interconnected bones in the first animation skeleton 118 at different timesteps of the first animation 114. For example, the heuristic placement module 130 inserts multiple audio cues for the first sound 124 at multiple different timesteps of the first animation 114 based upon values of features of the interconnected bones of the first animation skeleton 118 at the multiple different timesteps.

The ML placement module 132 can refine placement of the audio cues by the heuristic placement module 130. The ML placement module 132 identifies a timestep of the first animation 114 where the heuristic placement module 130 has placed an audio cue for the first sound 124. The ML placement module 132 selects timesteps that are within a predefined time window that is centered on the timestep of the first animation 114 where the heuristic placement module 130 placed the audio cue for the first sound 124. For the selected timesteps, the ML placement module 132 obtains values of features of the interconnected bones of the first animation skeleton 118. Optionally, the ML placement module 132 computes values of additional features of the interconnected bones of the first animation skeleton 118 at the selected timesteps.

Upon the ML placement module 132 obtaining the values of the features of the selected timesteps and computing the values of the additional features for the selected timesteps, the ML placement module 132 provides such values on a timestep by timestep basis to the first sound model 140. The first sound model 140 has been trained to ascertain whether an audio cue for the first sound 124 is to be placed corresponding to a timestep of an animation based upon values of features of interconnected bones of the first animation skeleton 118 at the timestep (and optionally values of the additional features of the interconnected bones of the first animation 114 at the timestep).

The first sound model 140 receives values of features of the interconnected bones of the first animation skeleton 118 at a selected timestep and optionally receives values of the additional features of the interconnected bones of the first animation skeleton 118 at the selected timestep. The first sound model 140 computes a confidence score based upon the aforementioned values, where the confidence score is indicative of a likelihood that an audio cue for the first sound 124 should be inserted into the first animation 114 at the selected timestep. Thus, the first sound model 140 computes confidence scores for the timesteps selected by the ML placement module 132. The ML placement module 132 receives the confidence scores and compares the confidence scores with a predefined threshold. For example, the first sound model 140 outputs a confidence score having a value of 0-1 for a timestep, with a higher value indicating a higher likelihood that an audio cue for the first sound 124 should be inserted into the first animation 114 corresponding to the timestep.

When the confidence value for the timestep is above the predefined threshold, the ML placement module 132 inserts an audio cue for the first sound 124 into the first animation 114 corresponding to the timestep. In contrast, when the confidence value for the timestep is at or below the predefined threshold, the ML placement module 132 does not insert an audio cue for the first sound 124 into the first animation 114 at the timestep. In an embodiment, the ML placement module 132 is limited to placing a single audio cue within the time window that surrounds the timestep where the heuristic placement module 130 placed the audio cue for the first sound 124. Accordingly, when the first sound model 140 outputs confidence values for multiple timesteps that are above the predefined threshold, the ML placement module 132 can identify the highest confidence score from amongst the confidence scores and insert an audio cue for the first sound 124 corresponding to the timestep that corresponds to the highest confidence score (presuming that the confidence score is above the predefined threshold). The ML placement module 132 can repeat this process for timesteps of the first animation 114 where the heuristic placement module 130 inserted audio cues for the first sound 124.

Upon the ML placement module 132 inserting audio cues for the first sound 124 into the first animation 114, placement of such audio cues can be visualized in the video game animation engine 110 such that the video game developer can review the placement of the audio cues for the first sound 124 as determined by the ML placement module 132. The input receiver module 134 can receive input from the developer with respect to the placement of the audio cues for the first sound 124 by the ML placement module 132. For example, the input receiver module 134 can receive modifications to audio cues inserted into the first animation 114 by the ML placement module 132. Additionally, the input receiver module 134 can receive confirmation from the developer (sound engineer) that at least one audio cue is correctly placed by the ML placement module 132. Moreover, the input receiver module 134 can receive an instruction to delete an audio cue inserted at a timestep of the first animation 114, and the video game animation engine 110 can delete the audio cue based upon such instruction.

The input receiver module 134, upon receiving confirmation that audio cues for the first sound 124 are correctly placed in the first animation 114, can obtain values for features of the first animation skeleton 118 corresponding to the timesteps where the audio cues are confirmed to be correct by the developer. Additionally, the input receiver module 134 can compute values for additional features based upon the values of the features referenced above. The input receiver module 134 can transmit these feature values and additional feature values to the server computing system 104. The trainer module 144 can further train the first sound model 140 based upon these values of the features and the additional values for the features, together with an indication that audio cues were properly placed at timesteps that have such values. Accordingly, the first sound model 140 is updated over time with respect to the first animation skeleton 118.

It is to be understood that the heuristic placement module 130 is optional. For example, The ML placement module 132 can obtain values for features for each timestep in an animation and provide a computer-implemented model with such values. Moreover, while the computer-implemented sound models 140-142 have been described above as being well suited to predict a timestep where an audio cue for a sound is to be inserted, the sound models 140-142 models can be configured to predict other features of an animation, such as direction of movement, an action being performed by a character (e.g., run, walk, jump, etc.), and so forth.

The trainer module 144 can initially train a computer-implemented model (such as the first sound model 140) based upon a relatively small number of labels set forth by the developer of the video game. For example, with respect to an animation, the video game animation engine 110 can receive a relatively small number of audio cues for the first sound 124, where such audio cues are placed at timesteps of the first animation 114. Feature values corresponding to the timesteps where the audio cues for the first sound 124 were placed can be provided to the server computing system 104, and the trainer module 144 can train the first sound model 140 based upon such feature values (as well as feature values corresponding to timesteps where there are no audio cues for the first sound).

It is again emphasized that the video game animation engine 110 (e.g., optionally configured with a plugin) exhibits various technical advantages over conventional video game animation engines. The video game animation engine 110 allows for a developer to relatively quickly insert audio cues for sounds into animations, rather than requiring the developer to manually insert thousands of audio cues for sounds across animations of the video game. This conserves time of the developer, and thus the client computing device 102 operated by the developer can be used for other tasks, such as designing further animations.

Figure 2:
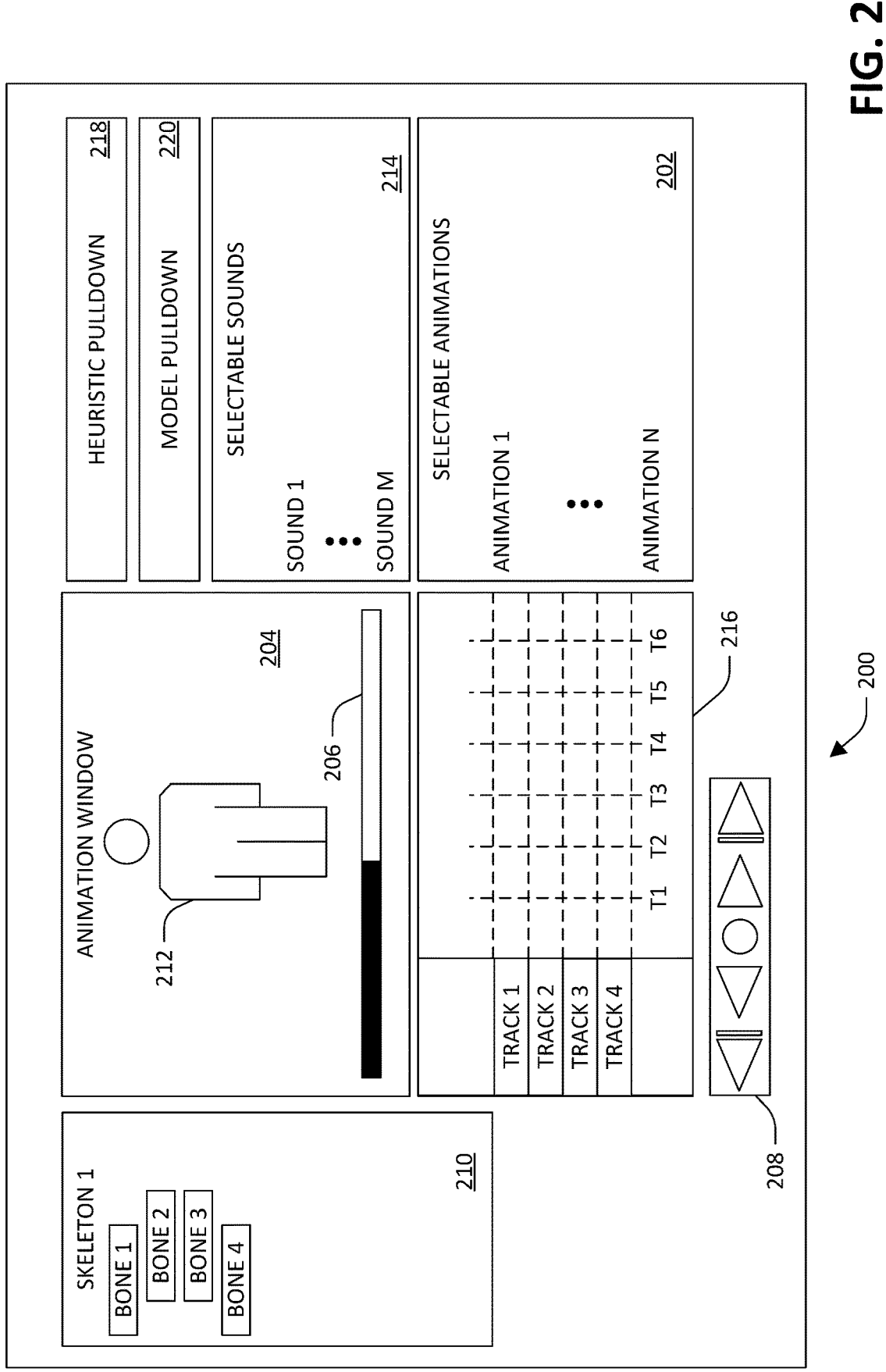
FIG. 2 is a schematic of a graphical user interface of a video game animation engine.

Referring now to FIG. 2, a graphical user interface (GUI) 200 of the video game animation engine 110 is illustrated. The GUI 200 includes a window 202 that depicts selectable animations in the animation library 112. Selection of an animation in the window 202 can cause the video game animation engine 110 to present such animation in an animation window 204 of the GUI 200. The animation window 204 can include a status bar 206 that indicates status of the animation shown in the animation window 204 with respect to a timeline of such animation. The GUI 200 can further include a panel 208 that includes buttons that can be employed to cause the animation to play, cause the animation to fast forward, cause the animation to pause, cause the animation to rewind, and so forth.

The GUI 200 also includes a window 210 that graphically depicts a hierarchical relationship amongst interconnected bones of an animation skeleton used in connection with animating an object 212 in the selected animation. While the object 212 is depicted as being a human character, as noted above, the object 212 can be a leaf, a tree, an animal, or any other suitable animatable object. Selection of a bone in the window 210 can cause values of features of such bone to be presented in the graphical user interface 200.

The GUI 200 also includes a window 214 that depicts sounds that can be emitted during an animation. The developer of the video game can select a sound from the selectable sounds illustrated in the window 214.

The GUI 200 further includes a window 216 that depicts timesteps of the selected animation and placement of audio cues for sounds that are to be emitted when the animation is played during play of a video game. As illustrated in FIG. 2, the window 216 includes identifiers for tracks in the selected animation. A developer can assign tracks to the animation for organizational purposes. For example, the first track can correspond to a left foot of the object 212 impacting the ground, the second track corresponds to the left foot of the object 212 leaving the ground, the third track corresponds to the right foot of the object 212 impacting the ground, and the fourth track corresponds to the right foot of the object 212 leaving the ground. The use of tracks is optional but can aid the developer with assigning audio cues to the animation presented in the animation window 204.

The window 216 also includes identifiers for timesteps of the animation. In the GUI 200 as depicted in FIG. 2, no audio cues for sounds have been placed at timesteps T1-T6 of the animation presented in the animation window 204.

The GUI 200 can further include a heuristic pulldown 218, where the heuristic pulldown 218 is selectable by the developer. Upon the developer selecting the heuristic pulldown 218, a list of heuristic algorithms that can be employed to automatically place audio cues in the selected animation are presented to the developer. The GUI 200 can further include a model pulldown 220, where upon the model pull down being selected, a list of computer-implemented models that are configured to predict timesteps where audio cues are to be placed in animations is presented.

Figure 3:
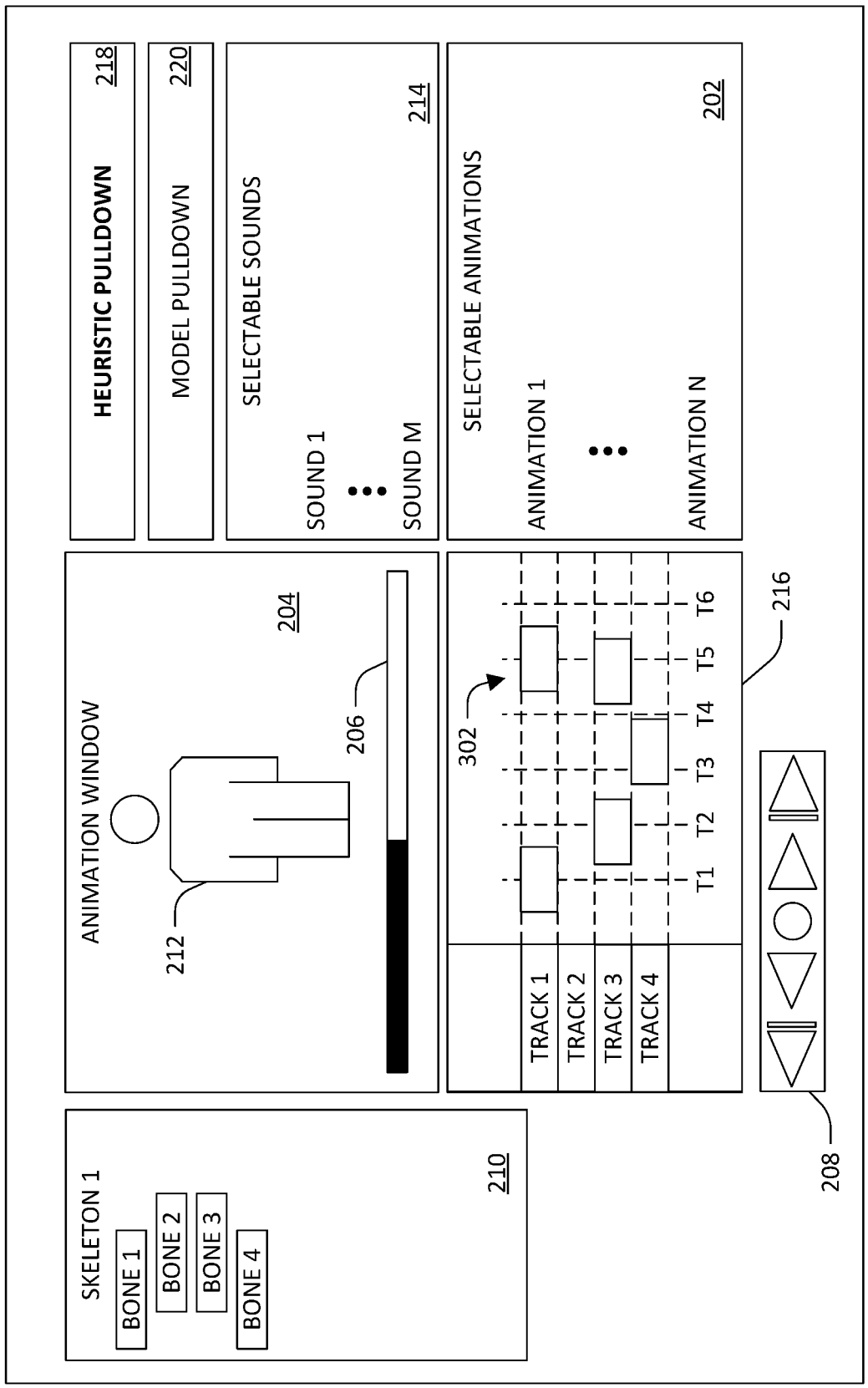
FIG. 3 is a schematic of the graphical user interface of the video game animation engine that depicts insertion of audio cues for a sound in an animation in a video game by a heuristic algorithm.

Referring now to FIG. 3, the GUI 200 is presented, where the window 216 includes graphical objects 302 that represent audio cues for the first sound 124 placed in the animation by way of a heuristic algorithm selected by way of the heuristic pulldown 218. For instance, the developer can select the first sound 124 from the window 214 and can further select the heuristic pull down 218, whereupon a at least one heuristic algorithms that corresponds to the first sound 124 is presented. The developer can select the heuristic algorithm, and the animation engine 110 executes the heuristic algorithm and automatically places audio cues in the animation presented in the animation window 204. The heuristic algorithm places the audio cues for the selected first sound 124 as shown in the window 216.

Figure 4:
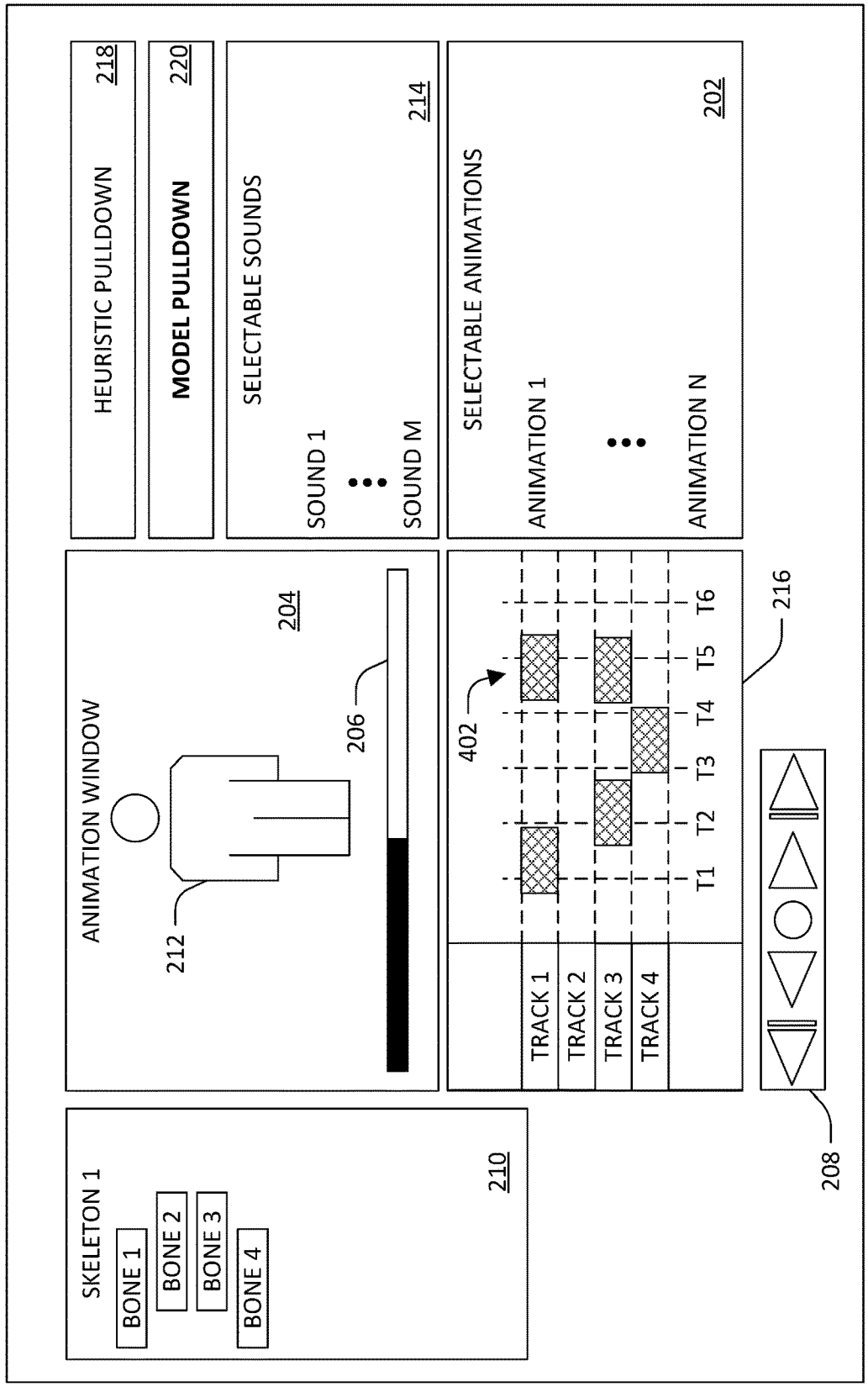
FIG. 4 is a schematic of the graphical user interface of the video game animation engine that depicts insertion of audio cues for the sound in the animation in the video game based upon confidence scores computed by a computer-implemented model.

Turning now to FIG. 4, the GUI 200 is again presented, where the window 216 includes graphical objects 402 that represent audio cues for the first sound 124 placed in the animation by way of a computer implemented model (e.g., the first sound model 140) selected by way of the model pull down 220. In an example, after the developer has the video game animation engine 110 execute the heuristic algorithm, the developer can select a computer-implemented model from a list of computer-implemented models that correspond to the first sound 124. The selected computer-implemented model automatically places audio cues in the animation presented in the animation window 204 (as represented by reference numeral 402), where the computer-implemented model places the audio cues as illustrated in the window 216. Comparison between FIGS. 3 and 4 illustrates that the computer-implemented model positioned some of the audio cues for the selected sound at different timesteps when compared to placement of the audio cues by the heuristic algorithm.

Figure 5:
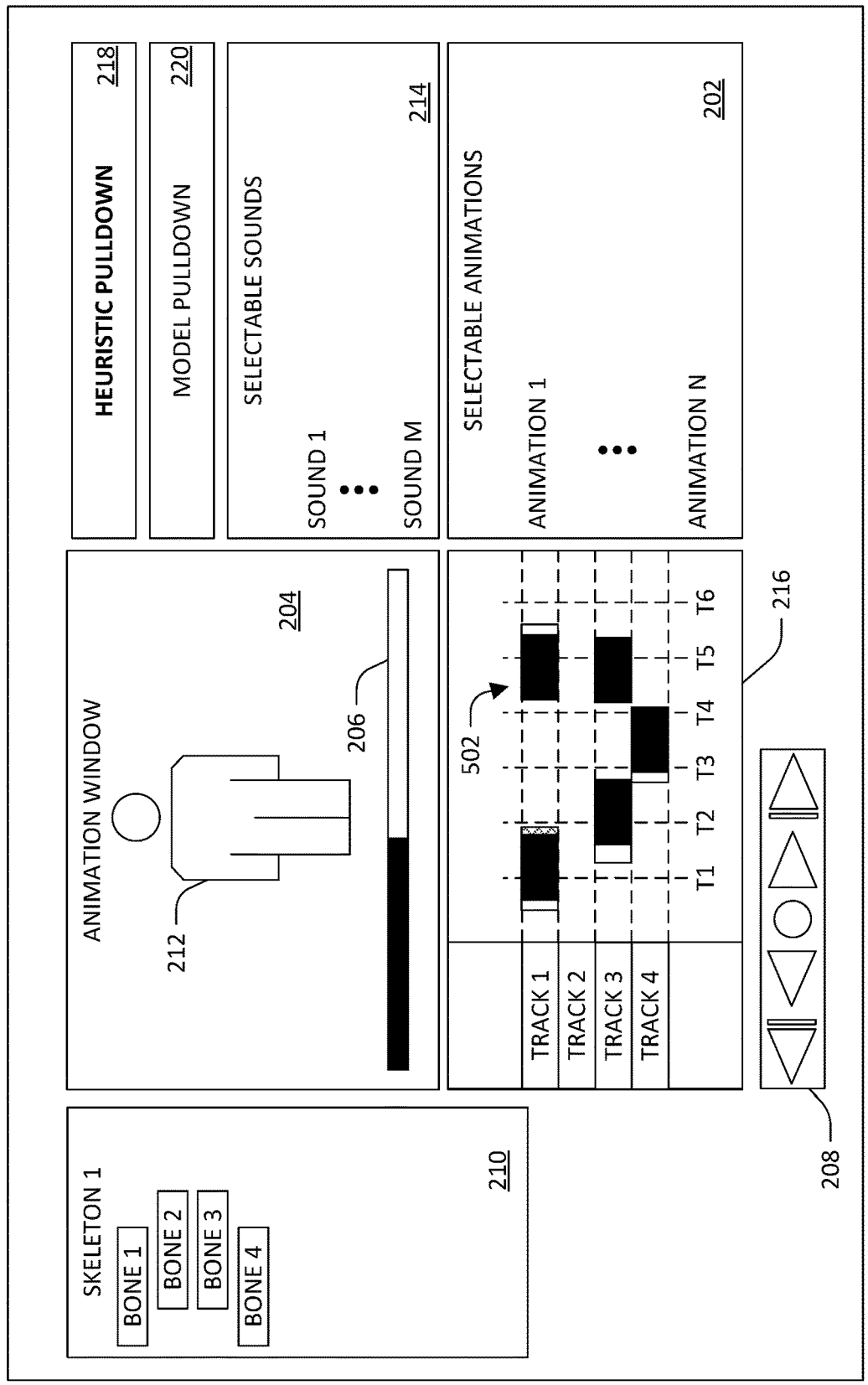
FIG. 5 is another schematic of the graphical user interface of the video game animation engine that depicts modification of placement of the audio cues for the sound by a developer in the animation of the video game.

Referring briefly to FIG. 5, the GUI 200 is again shown where positions of one or more of the audio cues are altered by the developer and/or confirmed by the developer. The audio cues at the confirmed timesteps are represented by reference numeral 502. Once the placement of the audio cues for the sound are finalized, the input receiver module 134 receives an indication from the developer that placement of the audio cues is completed. The audio cue placements can then be saved to disk. As described above, the confirmed placements of the audio cues can be used to further train the computer-implemented model.

With reference now to FIG. 6, an example output 600 of the ML placement module 132 is illustrated. The output corresponds to several different timesteps. For each timestep represented in the output 600, the output 600 includes an identity an animation skeleton of an animation, an identity of a track where the audio cue is placed, an identity of the model that output a confidence score for the timestep, an identity of the animation that corresponds to the confidence score, a timestep considered by the model, and a confidence score for the timestep. The example output 600 shown in FIG. 6 indicates that a probability of over 0.7 exists for three different timesteps in an animation, and thus audio cues for the sound are automatically placed at the three different timesteps.

Figure 7:
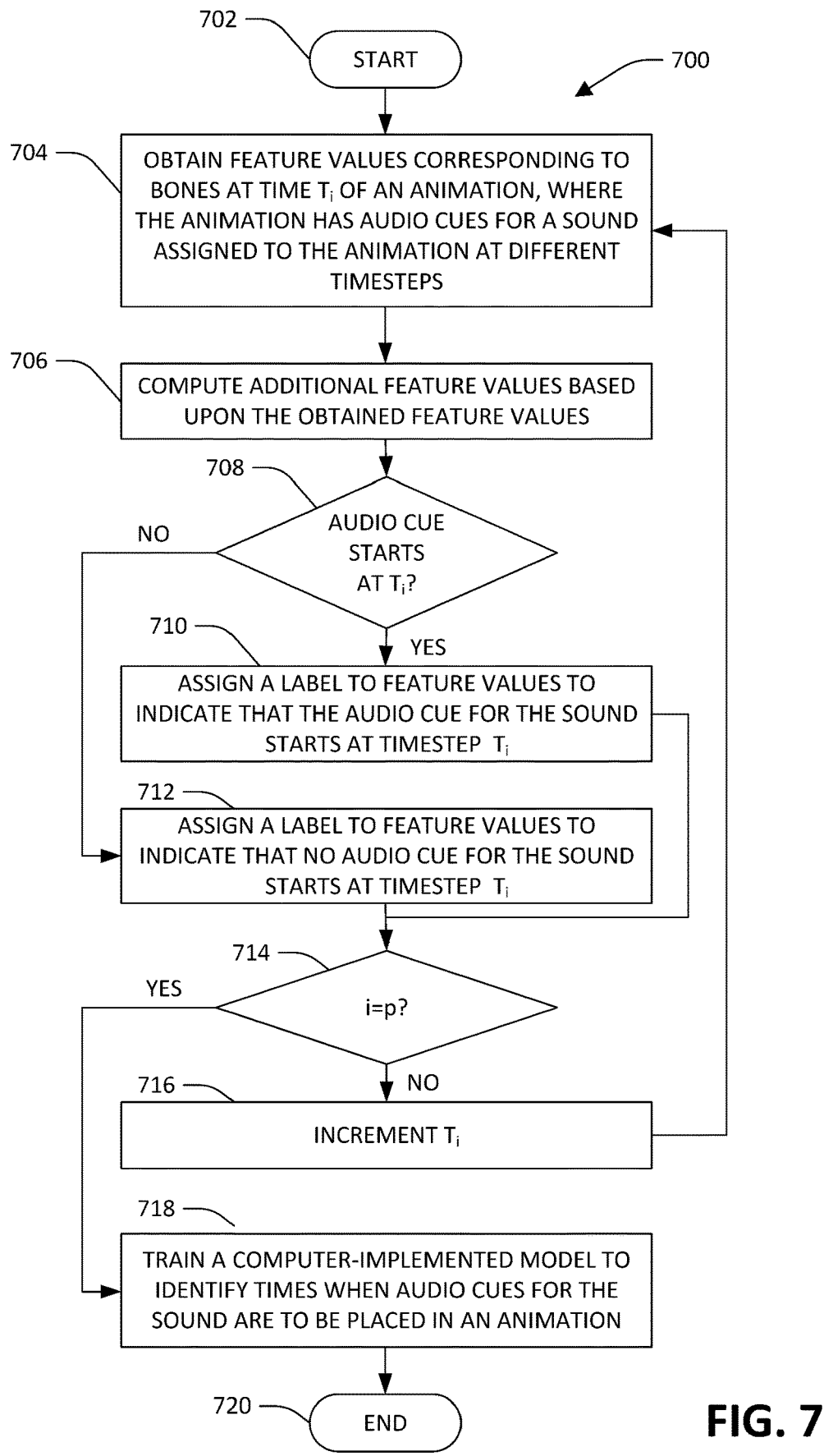
FIG. 7 is a flow diagram that illustrates a method for training a computer-implemented model to compute confidence scores with respect to placement of audio cues in a video game animation.
Figure 8:
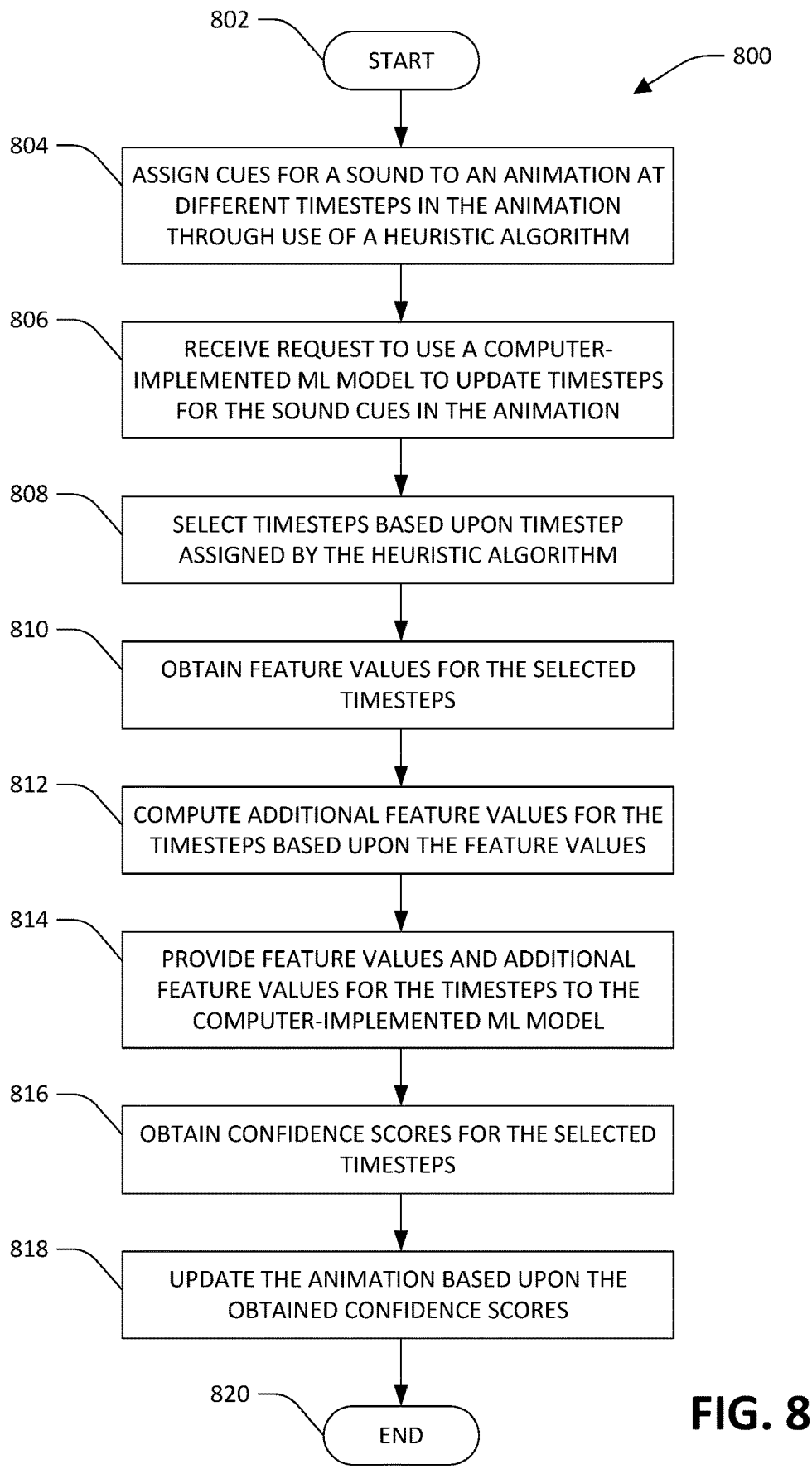
FIG. 8 is a flow diagram that illustrates a method for assigning audio cues for a sound to timesteps of a video game animation.
Figure 9:
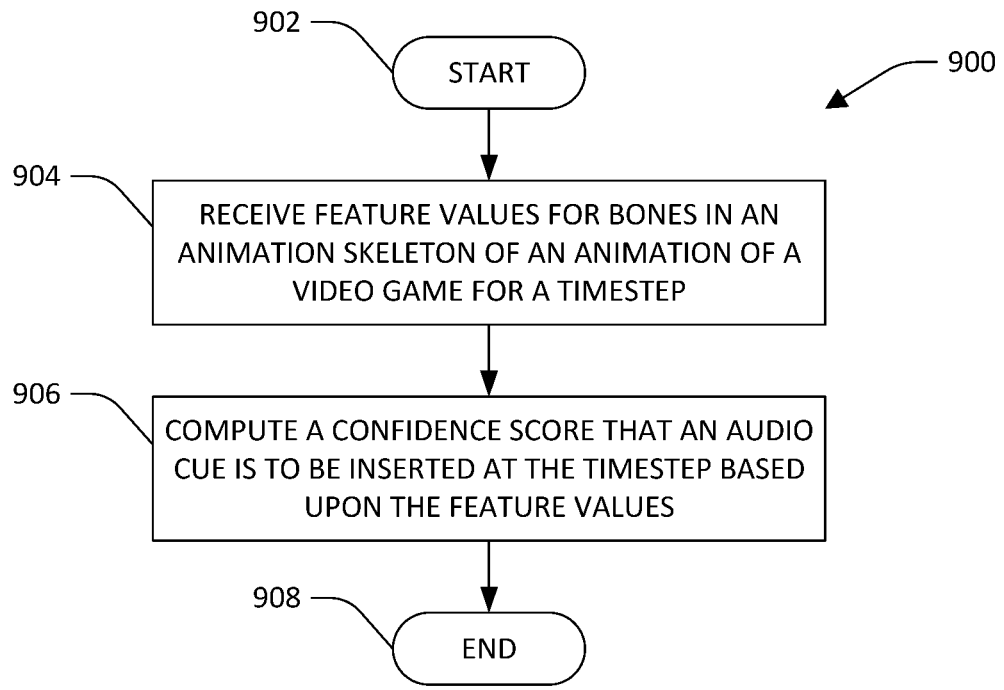
FIG. 9 is a flow diagram that illustrates a method for computing a confidence value with respect to placement of an audio cue at a timestep of a video game animation.

FIGS. 7-9 illustrate methods relating to placement of audio cues for sounds at timesteps of animations. While the methods are shown and described as being a series of acts that are performed in a sequence, it is to be understood and appreciated that the methods are not limited by the order of the sequence. For example, some acts can occur in a different order than what is described herein. In addition, an act can occur concurrently with another act. Further, in some instances, not all acts may be required to implement a method described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methods can be stored in a computer-readable medium, displayed on a display device, and/or the like.

Referring solely to FIG. 7, a flow diagram that depicts a method 700 for training a computer-implemented model to place audio cues for a sound at timesteps of animations is illustrated. The method 700 starts at 702, and at 704 feature values corresponding to interconnected bones of an animation skeleton are obtained at time $T_i$ of an animation. The animation has audio cues for a sound assigned to the animation at different timesteps of the animation. The placement of the audio cues in the animation has been approved by a developer.

At 706, additional feature values of the interconnected bones of the animation skeleton are computed for timestep $T_i$ based upon the feature values obtained at 704.

At 708, a determination is made as to whether an audio cue for the sound starts at timestep $T_i$ of the animation. When it is determined at 708 that an audio cue for the sound starts at timestep $T_i$, a label is signed to the feature values (and the additional feature values) to indicate that the audio cue for the sound starts at timestep $T_i$ of the animation. When it is determined at 708 that an audio cue for the sound does not start at timestep $T_i$, then at 712 a label is assigned to the feature values (and the additional feature values) to indicate that an audio cue for the sound does not start at timestep $T_i$.

At 714, a determination is made as to whether the ith timestep is the last (pth) timestep of the animation. When it is determined at 714 that the ith timestep is not the last timestep in the animation, then at 716 $T_i$ is incremented and the method 700 returns to 704. When it is determined at 714 that the ith timestep is the last timestep in the animation, then at 718 a computer-implemented model is trained to predict timesteps when audio cues for the sound are to be placed in an animation, where the computer-implemented model is trained based upon the feature values, the additional feature values, and the corresponding labels assigned at 710 and 712. The method 700 completes at 720.

Now referring to FIG. 8, a flow diagram illustrating a method 800 for updating an animation in a video game to include audio cues for a sound is illustrated. The method 800 starts at 802, and at 804 audio cues for a sound are assigned to an animation at different timesteps in the animation, the audio cues are assigned through use of a heuristic algorithm.

At 806, a request is received to use a computer-implemented model to update timesteps for the audio cues in the animation. At 808, timesteps within time windows that are centered on the audio cues assigned to the animation by the heuristic algorithm are selected. At 810, feature values for the selected timesteps are obtained.

At 812, additional feature values for the selected timesteps are computed based upon the feature values for the selected timesteps. At 814, for timesteps in the selected timesteps, feature values and additional feature values are provided to the computer-implemented model that corresponds to the request received at 806.

At 816, confidence scores output by the computer implemented model for the selected timesteps are obtained. At 818, the animation is updated based upon the confidence scores obtained at 816. For example, audio cues for the sound are placed at timesteps that have confidence values that are above a predefined threshold. The method 800 completes at 820.

Turning now to FIG. 9, a method 900 for computing a confidence score for a timestep in an animation of a video game is illustrated. The method 900 starts at 902, and at 904 feature values for bones of an animation skeleton of an animation of a video game are received for a timestep of the animation. At 906, a confidence score that is indicative of a likelihood that an audio cue is to be inserted in the animation at a location corresponding to the timestep is computed based upon the feature values. As described above, the audio cue can be placed based upon the computed confidence score. The method 900 completes at 908.

Figure 10:
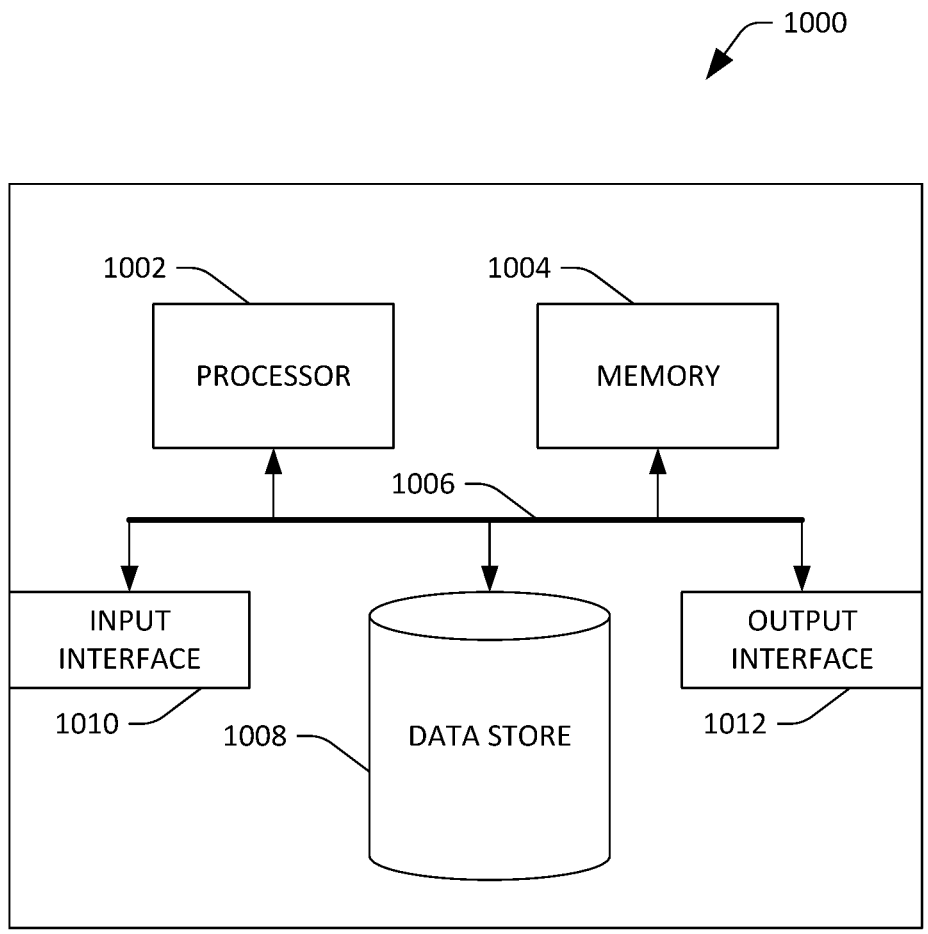
FIG. 10 is a schematic that depicts a computing system.

Referring now to FIG. 10, a high-level illustration of an exemplary computing device 1000 that can be used in accordance with the systems and methodologies disclosed herein is illustrated. For instance, the computing device 1000 may be used in a system that is configured to assign audio cues for sounds to timesteps of animations of video games. By way of another example, the computing device 1000 can be used in a system that is configured to train computer-implemented models to predict timesteps of video game animations where audio cues for Foley sounds are to be placed. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store animations, sounds, audio cues, etc.

The computing device 1000 additionally includes a data store 1008 that is accessible by the processor 1002 by way of the system bus 1006. The data store 1008 may include executable instructions, animations, animation skeletons, audio cues, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Various features pertaining to a computer-implemented video game animation engine have been described herein and correspond to at least the following examples.

(A1) In an aspect, a computer-implemented method includes obtaining a video game animation, where the video game animation includes an animation skeleton that includes interconnected bones, and further where the animation skeleton moves over several timesteps. The method also includes, for a timestep in the several timesteps, obtaining values of features of the interconnected bones. The method further includes providing the values of the features to a computer-implemented model that has been trained to compute confidence scores with respect to placement of audio cues for a sound in animations. The method additionally includes obtaining a confidence score for the timestep from the computer-implemented model, where the confidence score is computed by the computer-implemented model based upon the values of the features, and further where the confidence score is indicative of a likelihood that an audio cue for the sound should be inserted into the video game animation such that the video game animation, when played during play of a video game, emits the sound at the timestep. The method also includes, based upon the confidence score, and within the video game animation engine, inserting the audio cue for the sound into the video game animation such that when the video game animation is played during play of a video game, emission of the sound is initiated at the timestep of the video game animation.

(A2) In some embodiments of the method of (A1), the method also includes computing, by the computer-implemented model, the confidence score.

(A3) In some embodiments of the method of at least one of (A1)-(A2), the method further includes comparing the confidence score for the timestep with a predefined threshold, where the audio cue for the sound is inserted into the video game animation due to the confidence score for the timestep being greater than the predefined threshold.

(A4) In some embodiments of the method of at least one of (A1)-(A3), the method additionally includes, prior to providing the values of the features to the computer-implemented model, computing values of additional features of the interconnected bones based upon the values of the features of the interconnected bones.

(A5) In some embodiments of the method of (A4), the values of the features include values of locations of the interconnected bones at the timestep, and further where the values of the additional features include at least one of values of velocities of the interconnected bones at the timestep or values of accelerations of the interconnected bones at the timestep.

(A6) In some embodiments of the method of at least one of (A1)-(A5), the method additionally includes, prior to providing the values of the features to the computer-implemented model, using a heuristic algorithm to insert a second audio cue for the sound at a second timestep, where the values of the features are provided to the computer-implemented model due to the timestep being within a predefined number of timesteps from the second timestep.

(A7) In some embodiments of the method of (A6), the method further includes identifying that the second audio cue for the sound was inserted by the heuristic algorithm at the second timestep. The method additionally includes obtaining sets of values of the features for multiple timesteps within the predefined number of timesteps from the second timestep. The method also includes providing the sets of values of the features for the multiple timesteps to the computer-implemented model, where multiple confidence scores are computed by the computer-implemented model based upon the sets of values of the features such that a respective confidence value is computed by the computer-implemented model for each timestep in the multiple timesteps, where a set of values of the features for a third timestep that is not within the predefined number of timesteps from the second timestep is not provided to the computer-implemented model, and further where the audio cue for the sound is inserted at the timestep based upon the confidence score being highest from amongst the multiple confidence scores computed by the computer-implemented model.

(A8) In some embodiments of the method of at least one of (A1)-(A7), the method further includes receiving an indication that a user of the video game animation engine has repositioned the audio cue for the sound from the timestep to a second timestep. The method additionally includes, based upon the indication, training the computer-implemented model, where the computer-implemented model is trained based upon second values of the features of the interconnected bones at the second timestep and a corresponding label that indicates that the user of the video game animation engine placed the audio cue for the sound at the second timestep.

(A9) In some embodiments of the method of at least one of (A1)-(A8), the method also includes assigning a visual indication to the audio cue in a graphical user interface of the video game animation engine, where the visual indication indicates that the audio cue for the sound was inserted at the timestep in the animation based upon the confidence score output by the computer-implemented model.

(B1) In another aspect, a method performed by a video game animation engine when the video game animation engine is executed by at least one processor includes obtaining a video game animation for a video game, where the video game animation includes an animation skeleton that moves over a window of time that includes several timesteps, where the animation skeleton includes interconnected bones, where the interconnected bones have respective feature values at each timestep in the several timesteps. The method also includes obtaining feature values of the interconnected bones at a timestep in the several timesteps. The method further includes providing the feature values to a computer-implemented model, where the computer-implemented model has been trained to compute confidence scores regarding placement of audio cues for a sound, and further where the computer-implemented model computes a confidence score for the timestep based upon the features values of the interconnected bones at the timestep. The method additionally includes inserting an audio cue for the sound for the timestep in the several timesteps based upon the confidence score computed by the computer-implemented model such that when the video game animation is played during play of the video game, the sound is initiated at the timestep of the animation.

(B2) In some embodiments of the method of (B1), the animation skeleton represents a human.

(B3) In some embodiments of the method of (B2), the sound pertains to a foot of the human impacting the ground in the animation.

(B4) In some embodiments of the method of at least one of (B1)-(B3), the method also includes selecting the timestep due to the timestep being within a predefined number of timesteps from a second timestep, where the feature values of the interconnected bones at the timestep are provided to the computer-implemented model in response to selecting the timestep.

(B5) In some embodiments of the method of (B4), the method also includes prior to providing the feature values to the computer-implemented model, inserting the audio cue at the second timestep.

(B6) In some embodiments of the method of (B5), a heuristic algorithm inserted the audio cue at the second timestep based upon second feature values of the interconnected bones at the second timestep.

(B7) In some embodiments of the method of at least one of (B1)-(B6), the method also includes, subsequent to inserting the audio cue at the timestep, receiving confirmation from an audio engineer that the audio cue is properly inserted at the timestep. The method additionally includes training the computer-implemented model based upon the confirmation.

(B8) In some embodiments of the method of at least one of (B1)-(B7), the method also includes, prior to providing the feature values to the computer-implemented model, computing additional feature values of the interconnected bones at the timestep. The method additionally includes providing the additional feature values together with the feature values to the computer-implemented model, where the confidence score is computed by the computer-implemented model based further upon the additional feature values.

(B9) In some embodiments of the method of (B8), the feature values include locations of the interconnected bones at the timestep, and further where the additional feature values include at least one of velocities or accelerations of the interconnected bones.

(B10) In some embodiments of the method of at least one of (B1)-(B9), the method also includes, subsequent to inserting the audio cue at the timestep, presenting a graphical representation of the audio cue on a timeline in a graphical user interface of the video game animation engine. The method additionally includes receiving an instruction to move the audio cue from the timestep to a second timestep such that when the animation is played during play of the video game the sound is played at the second timestep of the animation.

(C1) In another aspect, a computing system includes a processor and memory, where the memory stores instructions that, when executed by the processor, cause the processor to perform at least one of the methods disclosed herein (e.g., any of the methods of (A1)-(A9) or (B1)-(B10)).

(D1) In yet another aspect, a computer-readable storage medium includes instructions that, when executed by a processor, cause the processor to perform at least one of the methods disclosed herein (e.g., any of the methods of (A1)-(A9) or (B1)-(B10)).

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing system comprising:
a processor; and
memory storing a video game animation engine that, when executed by the processor, causes the processor to perform acts comprising:
obtaining a video game animation, where the video game animation includes an animation skeleton that includes interconnected bones, and further where the animation skeleton moves over several timesteps;
for a timestep in the several timesteps, obtaining values of features of the interconnected bones;
providing the values of the features to a computer-implemented model that has been trained to compute confidence scores with respect to placement of audio cues for a sound in animations;
obtaining a confidence score for the timestep from the computer-implemented model, where the confidence score is computed by the computer-implemented model based upon the values of the features, and further where the confidence score is indicative of a likelihood that an audio cue for the sound should be inserted into the video game animation such that the video game animation, when played during play of a video game, emits the sound at the timestep;
based upon the confidence score, and within the video game animation engine, inserting the audio cue for the sound into the video game animation such that when the video game animation is played during play of the video game, emission of the sound is initiated at the timestep of the video game animation; and
assigning a visual indication to the audio cue in a graphical user interface of the video game animation engine, where the visual indication indicates that the audio cue for the sound was inserted at the timestep in the animation based upon the confidence score output by the computer-implemented model.

2. The computing system of claim 1, the acts further comprising computing, by the computer-implemented model, the confidence score.

3. The computing system of claim 1, the acts further comprising:
comparing the confidence score for the timestep with a predefined threshold, where the audio cue for the sound is inserted into the video game animation due to the confidence score for the timestep being greater than the predefined threshold.

4. The computing system of claim 1, the acts further comprising:
prior to providing the values of the features to the computer-implemented model, computing values of additional features of the interconnected bones based upon the values of the features of the interconnected bones; and
providing the values of the additional features to the computer-implemented model together with the values of the features, where the confidence score is computed by the computer-implemented model based further upon the values of the additional features.

5. The computing system of claim 4, where the values of the features include values of locations of the interconnected bones at the timestep, and further where the values of the additional features include at least one of values of velocities of the interconnected bones at the timestep or values of accelerations of the interconnected bones at the timestep.

6. The computing system of claim 1, the acts further comprising:
prior to providing the values of the features to the computer-implemented model, using a heuristic algorithm to insert a second audio cue for the sound at a second timestep, where the values of the features are provided to the computer-implemented model due to the timestep being within a predefined number of timesteps from the second timestep.

7. The computing system of claim 6, the acts further comprising:
identifying that the second audio cue for the sound was inserted by the heuristic algorithm at the second timestep;
obtaining sets of values of the features for multiple timesteps within the predefined number of timesteps from the second timestep; and
providing the sets of values of the features for the multiple timesteps to the computer-implemented model, where multiple confidence scores are computed by the computer-implemented model based upon the sets of values of the features such that a respective confidence value is computed by the computer-implemented model for each timestep in the multiple timesteps, where a set of values of the features for a third timestep that is not within the predefined number of timesteps from the second timestep is not provided to the computer-implemented model, and further where the audio cue for the sound is inserted at the timestep based upon the confidence score being highest from amongst the multiple confidence scores computed by the computer-implemented model.

8. The computing system of claim 1, the acts further comprising:
receiving an indication that a user of the video game animation engine has repositioned the audio cue for the sound from the timestep to a second timestep; and
based upon the indication, training the computer-implemented model, where the computer-implemented model is trained based upon second values of the features of the interconnected bones at the second timestep and a corresponding label that indicates that the user of the video game animation engine placed the audio cue for the sound at the second timestep.

9. A method performed by a video game animation engine when the video game animation engine is executed by at least one processor, the method comprising:
obtaining a video game animation for a video game, where the video game animation includes an animation skeleton that moves over a window of time that includes several timesteps, where the animation skeleton includes interconnected bones, where the interconnected bones have respective feature values at each timestep in the several timesteps;
obtaining feature values of the interconnected bones at a timestep in the several timesteps, wherein the timestep is selected based upon the timestep being within a predetermined number of timesteps from a second timestep in the several timesteps;

providing the feature values to a computer-implemented model, where the computer-implemented model has been trained to compute confidence scores regarding placement of audio cues for a sound, and further where the computer-implemented model computes a confidence score for the timestep based upon the features values of the interconnected bones at the timestep; and inserting an audio cue for the sound for the timestep in the several timesteps based upon the confidence score computed by the computer-implemented model such that when the video game animation is played during play of the video game, the sound is initiated at the timestep of the video game animation.

10. The method of claim 9, wherein the animation skeleton represents a human.

11. The method of claim 10, where the sound pertains to a foot of the human impacting a ground in the video game animation.

12. The method of claim 9, the method further comprising:
prior to providing the feature values to the computer-implemented model, inserting the audio cue at the second timestep.

13. The method of claim 12, where a heuristic algorithm inserted the audio cue at the second timestep based upon second feature values of the interconnected bones at the second timestep.

14. The method of claim 9, further comprising:
subsequent to inserting the audio cue at the timestep, receiving confirmation from an audio engineer that the audio cue is properly inserted at the timestep; and
training the computer-implemented model based upon the confirmation.

15. The method of claim 9, further comprising:
prior to providing the feature values to the computer-implemented model, computing additional feature values of the interconnected bones at the timestep; and
providing the additional feature values together with the feature values to the computer-implemented model, where the confidence score is computed by the computer-implemented model based further upon the additional feature values.

16. The method of claim 15, where the feature values include locations of the interconnected bones at the timestep, and further where the additional feature values include at least one of velocities or accelerations of the interconnected bones.

17. The method of claim 9, further comprising:
subsequent to inserting the audio cue at the timestep, presenting a graphical representation of the audio cue on a timeline in a graphical user interface of the video game animation engine; and
receiving an instruction to move the audio cue from the timestep to a second timestep such that when the animation is played during play of the video game the sound is played at the second timestep of the video game animation.

18. A non-transitory computer-readable storage medium comprising instructions that, when executed by a processor, cause the processor to perform acts comprising:
obtaining a video game animation, where the video game animation includes an animation skeleton that includes interconnected bones, and further where the animation skeleton moves over several timesteps;
for a timestep in the several timesteps, obtaining values of features of the interconnected bones;
providing the values of the features to a computer-implemented model that has been trained to compute confidence scores with respect to placement of audio cues for a sound in animations;
obtaining a confidence score for the timestep from the computer-implemented model, where the confidence score is computed by the computer-implemented model based upon the values of the features, and further where the confidence score is indicative of a likelihood that an audio cue for the sound should be inserted into the video game animation with respect to the timestep;
based upon the confidence score, inserting the audio cue for the sound into the video game animation at the timestep such that when the video game animation is played during play of a video game, emission of the sound is initiated at the timestep of the video game animation; and
assigning a visual indication to the audio cue in a graphical user interface of the video game animation engine, where the visual indication indicates that the audio cue for the sound was inserted at the timestep in the animation based upon the confidence score output by the computer-implemented model.

* * * * *